May 22, 1956 S. B. WELCH ET AL 2,747,073
TEMPERATURE REGULATOR FOR HEATING APPLIANCES
Filed Sept. 27, 1954 3 Sheets-Sheet 1

*INVENTOR.*
STANLEY B. WELCH &
MILTON S. WILLIAMS, JR.
BY
THEIR ATTORNEY

*INVENTOR.*
STANLEY B. WELCH &
MILTON S. WILLIAMS, JR.
BY *Sheridan leh Beggs*
THEIR ATTORNEY

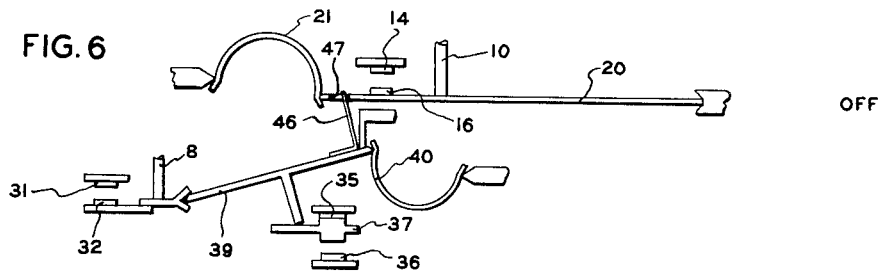
FIG. 6 — OFF
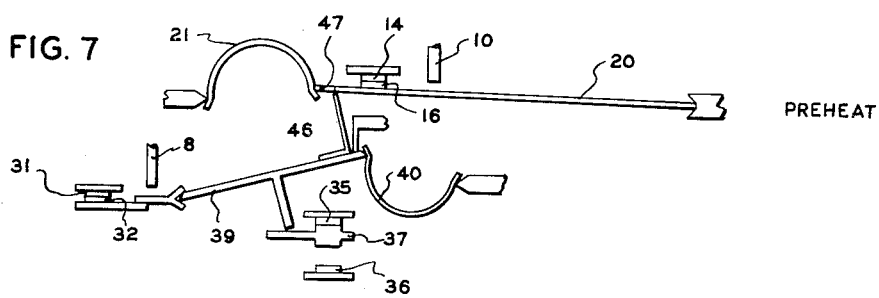
FIG. 7 — PREHEAT
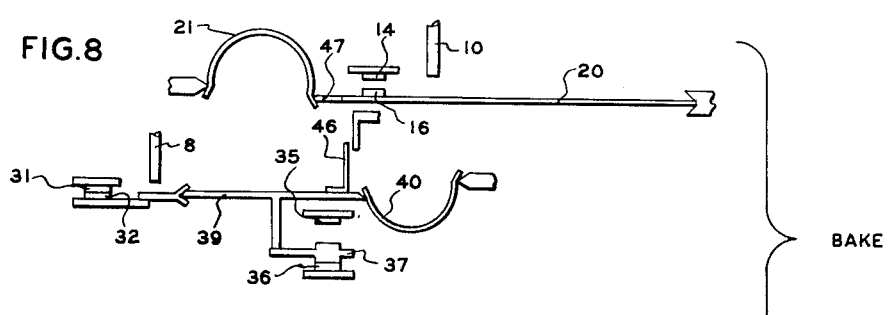
FIG. 8 — BAKE
FIG. 9 — BAKE
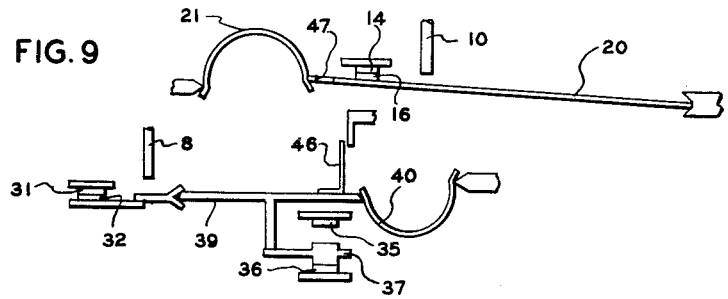
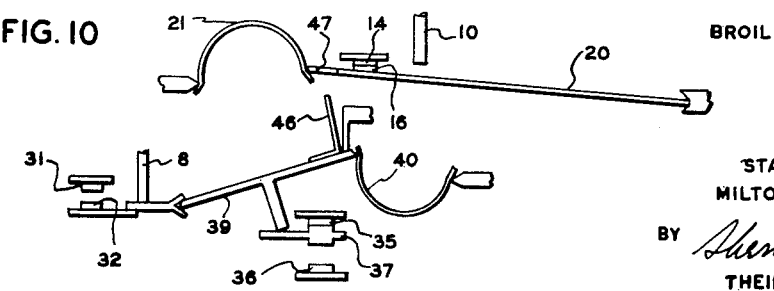
FIG. 10 — BROIL
*INVENTOR.*
STANLEY B. WELCH &
MILTON S. WILLIAMS, JR.
BY
THEIR ATTORNEY

United States Patent Office 2,747,073
Patented May 22, 1956

2,747,073

TEMPERATURE REGULATOR FOR HEATING APPLIANCES

Stanley B. Welch and Milton S. Williams, Jr., Louisville, Ky., assignors to General Electric Company, a corporation of New York Application September 27, 1954, Serial No. 458,643

4 Claims. (Cl. 219—20)

This invention relates to temperature regulating and control devices for electric heating systems and more particularly to thermostatic controls for domestic electric range ovens.

The principal object of our invention is to provide a safe and reliable temperature control device for an electric oven having a broiling unit energizable at high voltage for broiling and preheating, and at lower voltage for supplying heat during baking, in which the oven circuit is set for broiling or baking with automatic preheating by a single setting of a single control handle.

Further objects and advantages of our invention will become apparent as the following description proceeds, and the features of novelty which characterize our invention will be pointed out with particularity in the claims annexed to and forming a part of this specification.

Briefly stated, in accordance with one aspect of our invention we provide a switch mechanism in series with the broiling unit of a range oven for connecting it either to a relatively high voltage line (for example, 236 volts) or a lower voltage line (118 volts for example), a switch in series with the baking unit, and a set of thermostatically operated line contacts. Associated with the control handle of the device and operated thereby is a mechanism for shifting the broiling unit switch to its high voltage position whenever the handle is moved to its "off" or "broil" positions, this mechanism being so arranged that the switching takes place only after the main thermostatic contacts have been opened, thus eliminating the possibility of destructive arcing across the contacts of the broil unit switch. The main thermostatic contacts are of course arranged to be closed when the handle is moved from the "off" position to a position in the baking range, and by means responsive to the subsequent opening of these contacts the broiling unit switch is actuated to its low voltage position, thus terminating the preheating cycle and initiating the baking cycle in which heat is supplied by the baking unit operated at high voltage and the broiling unit operated at low voltage. In the present embodiment the baking unit switch which functions to disconnect the baking unit during broiling operations is associated with the broil unit switch, and is operated thereby to open position when the broil unit switch is actuated to its high voltage position upon movement of the control knob to either its "off" or "broil" position.

For a better understanding of our invention reference may be made to the accompanying drawing in which:

Fig. 6 is a diagrammatic view showing the switch mechanism in the "off" position.

Fig. 7 is similar to Fig. 6 but shows the parts in the preheat position.

Fig. 8 is similar to Fig. 6 but shows the parts as they appear immediately after the termination of a preheating cycle.

Fig. 9 is similar to Fig. 6 but shows the parts in the bake position.

Fig. 10 is similar to Fig. 6 but shows the parts in the broil position.

Figure 1:
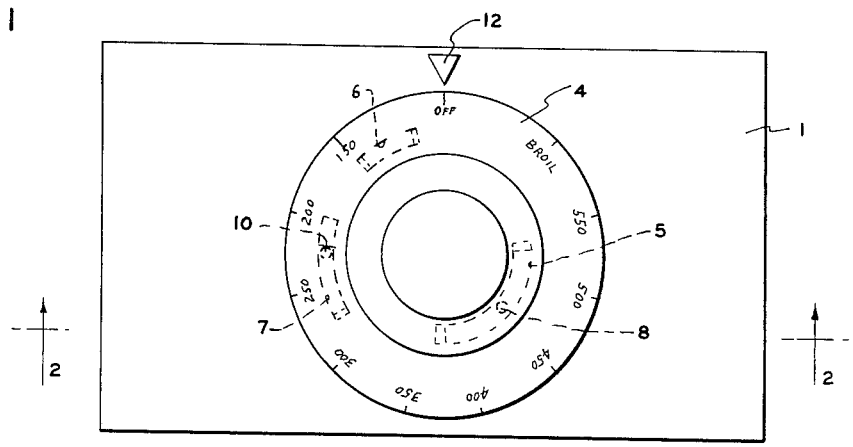
Fig. 1 is a top plan view of a temperature regulator embodying the invention.
Figure 2:
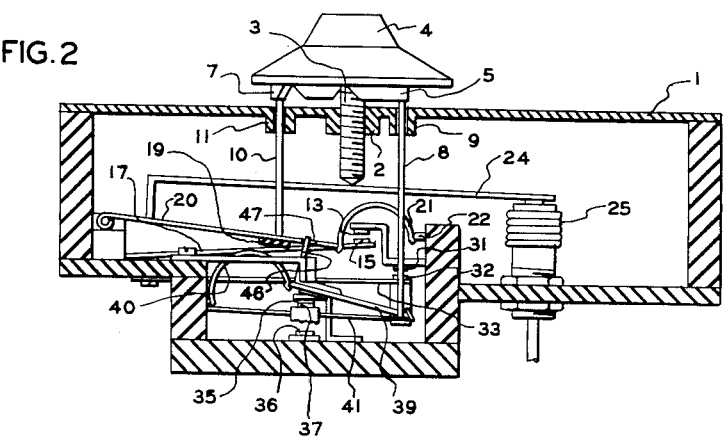
Fig. 2 is a sectional view taken along the line 2—2 in Fig. 1.
Figure 3:
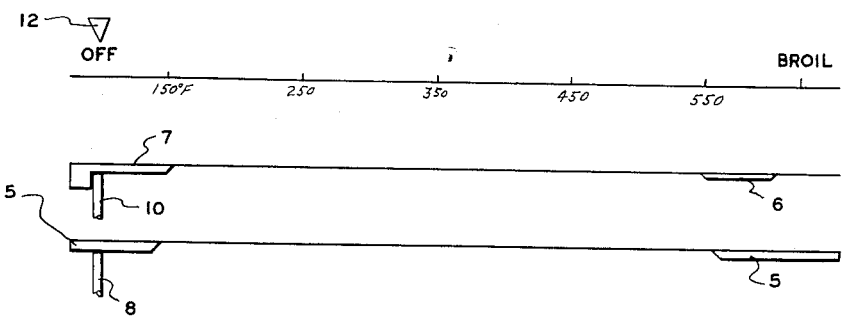
Fig. 3 is a development of the cam profiles on the control handle of the invention.

Referring first to Figs. 1 and 2 of the drawing, the switch mechanism of my temperature controller is mounted within the casing 1 preferably made of an insulating material and having a top wall provided with an opening to accommodate a bushing 2 having an opening therein arranged to receive a threaded stud 3 on which is mounted a control knob or handle 4. Handle 4 is provided with suitable indicia indicating, for example, "off" and "broil" positions and a range of baking positions extending over a suitable temperature scale, as shown. The underside of handle 4 is provided with two concentric cam surfaces having projecting cam portion 5 on the inner cam surface, and projecting cam portions 6 and 7 on the outer cam surface. Cooperating with cam portion 5 is a force transmitting member in the form of a push rod 8 projecting through an opening in top wall 1 provided with a bushing 9 for guiding movement of rod 8 along its axis. Similarly, a push rod 10 is supported in a bushing 11, and projects through the top wall of the casing into engagement with the outer cam surface on handle 4 so as to be movable along its axis by cam portions 6 and 7. It will be understood that upon rotation of control handle 4 push rod 8 is depressed by cam portion 5 upon engagement therewith, push rod 10 may be depressed by cam portions 6 and 7, and that thermo-responsive mechanism to be described is adjusted to different temperature settings by the resulting axial movement of threaded stud 3. To indicate the setting of handle 4 an index marker 12 on the top wall of casing 1 is provided, it being noted that push rods 8 and 10 and marker 12 are located in angularly spaced relationship about the axis of handle 4. It will be also noted that for greater clarity the cam program illustrated diagrammatically in Fig. 3 is laid out as if rods 8 and 10 and marker 12 were located in the same angular position; thus, in this figure these elements are shown in vertical alignment and should be considered to remain in this relationship insofar as Fig. 3 is concerned.

Figure 4:
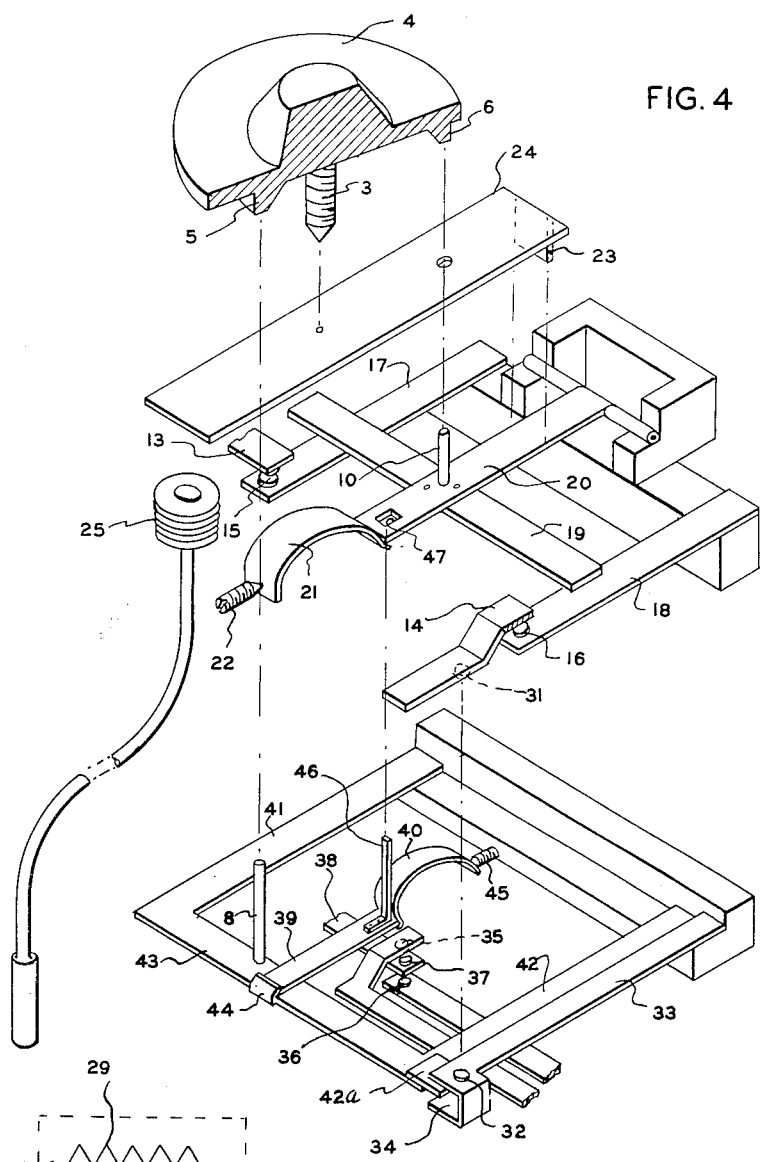
Fig. 4 is an exploded view of the temperature regulator.
Figure 5:
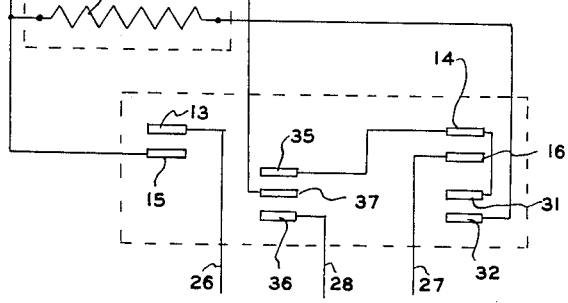
Fig. 5 is a wiring diagram showing the electrical connections of the device.

Referring now to Fig. 4 as well as Fig. 2, the temperature regulator is provided with switch means for regulating the supply of current to the oven controlled thereby which includes a pair of fixed contacts 13 and 14 cooperating with movable contacts 15 and 16 carried by cantilever spring arms 17 and 18 respectively. The fixed ends of arms 17 and 18 are secured to casing 1 so that the contact carrying ends thereof may be moved into and out of engagement with contacts 13 and 14 by cross member 19 secured to pivoted arm 20 which lies generally parallel to arms 17 and 18. The free end of pivot arm 20 is engaged by a U-shaped spring 21 supported between arm 20 and a set screw 22 threaded in an opening in a wall portion of casing 1. By means of spring 21, cross member 19 is biased out of engagement with arms 17 and 18 which, being biased towards fixed contacts 13 and 14, maintain contacts 13, 15 and 14, 16 in engagement unless a predetermined force is applied to arm 20 by projection 23 at the end of lever bar 24. Bar 24 rocks about a fulcrum provided by the end of threaded stud 3, and is engaged at its other end by bellows 25 which upon expansion tends to open contacts 13, 15 and 14, 16 through the linkage system just described. Bellows 25 is of course connected to a thermostatic bulb located in the space heated by the elements controlled by the regulator, and functions to maintain the temperature set by control knob 4 by opening and closing the main thermostatic contacts 13, 15 and 14, 16 in response to temperature. Thus as shown in Fig. 5 these contacts control the supply of energy from lines 26, 27 and neutral line 28 of a conventional three-wire power supply to broiling unit 29 and baking unit 30 located in an electric range oven.

In order to permit the disconnection of baking unit 30 from the heating circuit, a fixed contact 31 and a movable contact 32 carried on the free end of a spring arm 33 are provided for connection in series with baking unit 30. Arm 33 includes an off-set portion 34 at the end thereof by means of which contact 32 may be separated from contact 31. Contacts 31 and 32 are normally closed, being opened only when control handle 4 is moved to its "off" or "broil" positions by means hereinafter described.

In accordance with the present invention, broil unit 29 may be connected across power lines 26 and 27 to provide high wattage heat for broiling purposes and also for preheating the oven during the initial period of a baking operation, and may also be energized at a lower voltage by connecting it across line 26 and neutral line 28 so as to provide some heat in the upper portion of the oven during baking. Thus we provide a pair of fixed spaced-apart contacts 35 and 36 and a cooperating movable contact 37 carried by spring arm 38 and biased into engagement with contact 35 but movable into engagement with contact 36. As shown in Fig. 5, contact 37 is connected to one terminal of broiling unit 29, contact 36 is connected directly to the neutral line 28 and contact 35 is connected to contact 14 and is thus connected to line 27 whenever thermostatic contacts 14, 16 are closed. The position of movable contact 37 is determined by the position of a toggle link 39 having one end pivotally supported by an overcenter spring 40 and its other end pivotally supported by an overcenter spring member having spring arms 41 and 42, a cross piece 43 and a supporting tab 44 which supports the end of link 39. The fixed end of overcenter spring 40 is engaged by an adjustable set screw 45 threaded in a suitable opening in a wall of casing 1. Contact 37 is disengaged from contact 35 and shifted into engagement with contact 34 by downward movement of link 39 against arm 38.

Arm 42 carries a projecting member 42a located between arm 33 and off-set portion 34 so as to engage portion 34 upon downward movement of cross piece 43. It will be seen that push rod 8 bears on cross piece 43 and applies downward force thereto when its upper end is engaged by cam portion 5 upon rotation of handle 4 to the "off" or "broil" positions. In these positions link 39 is snapped over center to its raised position out of engagement with arm 38 and baking unit contacts 31 and 32 are disconnected because projection 42a bears against off-set portion 34 on arm 33.

Projecting upwardly from and fixed to the end of toggle link 39 overlying spring arm 38 is a force transmitting rod or member 46. Depending upon the position of toggle link 39 and pivoted arm 20, member 46 may be in contact with arm 20, spaced from arm 20, or projecting through aperture 47 adjacent the free end of arm 20. When the parts of the regulator are in the "off" position as shown in Fig. 2, rod member 46 is in a raised and tilted position so that its upper end projects through aperture 47. However upon rotation of handle 4 from its "off" position into the range of baking positions cam portions 5 and 7 are shifted out of engagement with rods 8 and 10 respectively, permitting toggle link 39 to rotate counterclockwise slightly (but not snap overcenter) thus shifting the free end of rod 46 to the left as viewed in Fig. 2, and also permitting pivoted arm 20 to rise so as to allow contacts 15 and 16 to engage fixed contacts 13 and 14 respectively. The free end of rod 46 is then in vertical alignment with a solid portion of arm 20 and is engaged thereby and forced downwardly, thus snapping toggle link 39 overcenter, on the first off cycle of the thermostatic mechanism. As the link snaps downwardly it engages arm 38, thus shifting contact 37 into engagement with contact 36.

In describing the operation of this temperature regulator particular reference will be made to Figs. 6 and 10 inclusive. In Fig. 6 the parts are shown in the "off" position previously described, it being noted that broil contact 37 is in engagement with high voltage contact 35, that the bake contacts 31 and 32 are open and that the main thermostatic contacts 14 and 16 are held in open position by push rod 10 because it is in engagement with cam portion 7 on the handle. As the handle is rotated to a position on the bake scale, push rod 8 drops off cam portion 5 and push rod 10 drops off cam portion 7 thus closing bake contacts 31 and 32 as well as main thermostatic contacts 13, 15 and 14, 16. The parts then assume the position shown in Fig. 7, and both broiling unit 29 and baking unit 30 are energized at full wattage (i. e. connected across lines 26 and 27) thereby preheating the oven to the desired baking temperature. As the temperature in the oven increases bellows 25 expands and finally exerts enough force on lever bar 24 to force pivot arm 20 downwardly thus first breaking main thermostatic contacts 13, 15 and 14, 16, and then exerting sufficient force on the free end of rod member 46 to snap toggle link 39 overcenter to the position shown in Fig. 8. In this position broiling unit 29 is energized through contact 36 rather than contact 35 and is therefore connected across lines 26 and 28, thus reducing its wattage to a value suitable for baking purposes. Assuming that the handle 4 is left in the same position in the baking range, the main thermostatic contacts then cycle on and off so as to maintain the desired temperature in the oven.

To prepare the oven for broiling handle 4 is rotated further in the same direction (i. e. clockwise as viewed in Fig. 1) to the "broil" position. As the handle is rotated push rod 10 engages cam portion 6 before push rod 8 engages cam portion 5 and thus pivot arm 20 is cammed downwardly so as to disengage the main thermostatic contacts before movable broil contact 37 engages high voltage contact 35 as a result of force exerted on the end of toggle link 39 by means of rod 8. Thus the switchover from low voltage to high voltage on broiling unit 29 is made after contact 35 is disconnected from the power circuit, and thus the possibility of an arc forming across contacts 35, 36, 37 is eliminated. It will be observed that if contact 37 were switched between contacts 35 and 36 during a period when the main thermostatic contacts were in closed position it is quite possible that an arc formed between contacts 36 and 37 as they opened would be carried over to contact 35 thus establishing a direct short between lines 28 and 27.

When the handle is returned to the "off" position (by clockwise rotation as viewed in Fig. 1) at the completion of a baking or broiling operation cam 7 engages rod 10 before cam 5 engages rod 8 and hence main thermostatic contacts 13, 15 and 14, 16 are opened before broil contact 37 and bake contact 32 are actuated. For the same reason pivot arm 20 is forced to its lower position, as shown in Fig. 2, so as to position aperture 47 in position to receive the end of rod 46 as it is snapped upwardly upon downward movement of cross piece 43. It should be noted that the free end of rod 46 moves in an arc intersecting aperture 47 as cross piece 43 is shifted downwardly far enough to cause link 39 to snap overcenter. When the handle 4 is again rotated to a baking position and cam 5 is disengaged from rod 8, cross piece 43 moves upwardly a short distance (link 39 remaining in its raised position however) which is sufficient to shift the end of rod 46 laterally into vertical alignment with a solid portion of arm 20. Hence the mechanism is set so as to again reduce the voltage applied to broiling unit 29 as soon as the thermostatic mechanism completes one cycle of operation.

While we have shown and described a specific embodiment of our invention, we do not desire the invention to be limited to the particular construction shown and described, and we intend by the appended claims to cover all modifications within the true spirit and scope of our invention.

We claim as our invention:

1. A temperature regulator for an electric oven having separate baking and broiling elements comprising first switch means for regulating the supply of current to said elements, thermo-responsive means for controlling said first switch means in response to oven temperature, a handle for adjusting said thermo-responsive means to different temperature settings, said handle having "off" and "broil" positions in addition to a range of "bake" positions, second switch means in circuit with said broiling element for selectively connecting said element to one of two power circuits supplying current at different voltages, first means operated by said handle for actuating said second switch means so as to connect said broiling element to the higher voltage circuit upon manual movement of said handle to its "off" or "broil" positions, said thermo-responsive means being operable to close said first switch means upon movement of said handle from its "off" position to an intermediate position, means responsive to subsequent opening of said first switch means upon thermostatic operation of said thermo-responsive means for actuating said second switch means so as to connect said broiling element to the lower voltage circuit, second means operated by said handle for opening said first switch means and maintaining it in open position during actuation of said second switch means by said first handle operated means, and third switch means having a pair of normally closed contacts arranged to be connected in series with said baking element and operable to open circuit position by said first handle operated means upon movement of said handle to its "off" or "broil" positions.

2. A temperature regulator for an oven having separate baking and broiling elements comprising first switch means for regulating the supply of current to said elements, thermo-responsive means for controlling said first siwtch means in response to oven temperature, a handle for adjusting said thermo-responsive means to different temperature settings, said handle having "off" and "broil" positions in addition to a range of "bake" positions, a toggle link pivotally supported between a pair of over-center springs and arranged to actuate a movable contact in the broiling unit circuit into engagement with one or the other of a pair of fixed contacts energizable at different voltages, a first member operable by said handle for transmitting force to one end of said link sufficient to snap the other end of the link into a position causing said movable contact to engage the one of said fixed contacts energizable at relatively high voltage, means for operating said first member in repsonse to movement of said handle to its "off" or "broil" positions, a second member for transmitting force to said other end of said link so as to shift said other end of the link into a position causing said movable contact to engage the fixed contact energizable at relatively low voltage, said second member being operable in response to opening movement of said first switch means, and means operated by said handle for opening said first switch means and maintaining it in open position during actuation of said movable contact in response to movement of said handle.

3. A temperature regulator in accordance with claim 2 wherein said handle is provided with a cam surface in engagement with said first force transmitting member, said cam surface having a contour such that said first member is operated so as to transmit force to said link when said handle is moved to its "off" or "broil" positions.

4. A temperature regulator for an oven having separate baking and broiling elements comprising first switch means for regulating the supply of current to said elements, thermo-responsive means for controlling said first switch means in response to oven temperature, a handle for adjusting said thermo-responsive means to different temperature settings, said handle having "off" and "broil" positions in addition to a range of "bake" positions, a toggle link pivotally supported between a pair of over-center springs and arranged to actuate a movable contact in the broiling unit circuit into engagement with one or the other of a pair of fixed contacts energizable at different voltages, a first member operated by a first cam carried by said handle for transmitting force to one end of said link sufficient to snap the other end of the link into a position causing said movable contact to engage the one of said fixed contacts energizable at relatively high voltage upon movement of said handle to its "off" or "broil" positions, a second member for transmitting force to said other end of said link so as to shift it into a position causing said movable contact to engage the fixed contact energizable at relatively low voltage, said thermo-responsive means including a pivoted arm movable between contact open and contact closed positions in accordance with oven temperature located in a position overlying said second member so as to apply force thereto when said arm moves toward its contact oven position and said other end of said toggle link is in a raised position relative to said arm, said arm having an aperture therein located in a slightly displaced position with respect to the point at which it contacts said member so as to receive the free end of said second member when said arm is in its contact open position and said toggle link is snapped to its relatively raised position, a second cam carried by said handle in engagement with a rod bearing on said pivoted arm, said second cam having a contour such that said arm is shifted so as to open said first switch means and maintain it in open position during actuation of said movable contact in response to movement of said handle.

References Cited in the file of this patent
UNITED STATES PATENTS

| | | |
|---|---|---|
| 2,210,947 | Myers et al. | Aug. 13, 1940 |
| 2,388,702 | Pearce | Nov. 13, 1945 |
| 2,388,839 | Fry | Nov. 13, 1945 |
| 2,403,824 | Newell | July 9, 1946 |
| 2,675,455 | Richardson | Apr. 13, 1954 |